United States Patent [19]

Dallmeyer

[11] Patent Number: 5,407,974
[45] Date of Patent: Apr. 18, 1995

[54] SOLUTION POLYMER RECOVERY PROCESS

[75] Inventor: Hermann Dallmeyer, Sarnia, Canada

[73] Assignee: Polysar Rubber Corporation, Sarnia, Canada

[21] Appl. No.: 209,185

[22] Filed: Mar. 11, 1994

[51] Int. Cl.$^6$ ............................ C08C 2/06; C08F 6/12
[52] U.S. Cl. .................................. 523/328; 523/343; 528/499; 528/500
[58] Field of Search ................. 523/328, 343; 528/499, 528/500

[56] References Cited

U.S. PATENT DOCUMENTS

| | | | |
|---|---|---|---|
| 3,131,160 | 4/1964 | Alexander et al. | 260/33.6 |
| 3,160,586 | 12/1964 | Duke | 210/44 |
| 3,590,026 | 6/1971 | Carlson et al. | 260/94.7 |
| 4,546,172 | 10/1985 | Kohyama et al. | 525/343 |

FOREIGN PATENT DOCUMENTS 1249834  10/1989  Japan .................................. 528/499

Primary Examiner—Paul R. Michl
Assistant Examiner—Andrew E. C. Merriam
Attorney, Agent, or Firm—Joseph C. Gil; Godfried R. Akorli

[57] ABSTRACT

An improved process is provided for the recovery of a polymer from a solution thereof in a process wherein the polymer solution is contacted with hot water and steam to yield a slurry in water of polymer particles and a vapor stream comprising water vapor and the solvent, the slurry in water of polymer particles is passed to means to grossly separate the polymer particles and the water and the polymer particles are dried, wherein the water contains small particles of polymer and a portion thereof is mixed with the original polymer solution and the remaining portion is passed to the vessel wherein the polymer solution is first contacted with hot water and steam.

8 Claims, No Drawings

SOLUTION POLYMER RECOVERY PROCESS

FIELD OF THE INVENTION

This invention is directed to an improved process for the recovery of a polymer from a solution thereof wherein the fine particles of polymer formed in the water slurry production stage are recycled back partly to the solution and redissolved therein and partly to the water slurry production stage.

BACKGROUND OF THE INVENTION

In the synthetic polymer industry, it is well known to contact a solution of polymer with hot water and steam to form a slurry of polymer particles in water and a vapour stream comprising the solvent from the polymer solution and water vapour. The aforesaid vapour steam is processed so as to recover the solvent. The slurry of polymer particles in water is treated so as to grossly separate the polymer particles from the water and the separated polymer particles are then dried to yield essentially water free polymer. The water recovered from the separation of the polymer particles from the water may be partly recycled back to the stage at which the solution of polymer is contacted with hot water and steam or to the stage at which the polymer particles are grossly separated from the water—see U.S. Pat. Nos. 3,131,160 and 3,590,026. The slurry of polymer particles in water consists of polymer particles of a wide range of size including some small (fine) particles known in the business as fines. At the stage where the polymer particles are grossly separated from the water, it is well known that small (fine) polymer particles are carried with the water. The separation of the polymer particles from the water is not able to retain all of these small polymer particles with the majority of the larger polymer particles and the small polymer particles tend to be carried away with the water. This water stream containing the small polymer particles has to be treated to recover the small polymer particles, such as by treatment with, for example, hydrophic organic amines to cause agglomeration of the fine particles so that the so-agglomerated particles can be separated, as described in U.S. Pat. No. 3,160,586, or by decanting means and/or by using dissolved air flotation equipment, so that the water stream can then be properly treated to reduce dissolved inorganic components to make it suitable for re-use or discharge.

SUMMARY OF THE INVENTION

It is an objective of the present invention to provide a process whereby the fine rubber particles are recovered from the water stream and supplied to the process for the recovery of polymer, thereby reducing the polymer losses and minimizing the number of treatment steps that the water has to go through before being re-used or discharged.

DETAILED DESCRIPTION OF THE INVENTION

Accordingly, our invention is an improved process for the recovery of a polymer from a solution thereof in a solvent wherein polymer solution is supplied to one or more vessels in series wherein it is contacted with steam and hot water to form a slurry of polymer particles in water and a vapour stream comprising water vapour and solvent from the polymer solution which vapour stream is treated to recover the solvent, wherein the slurry of polymer particles in water is passed to means to grossly separate the polymer from the water to yield water wet polymer particles and a water stream which contains small particles of polymer and wherein the water wet polymer particles are passed to polymer drying means to yield essentially dry polymer, the improvement being that a portion of the water stream containing small particles of polymer is mixed with the original polymer solution whereby the small polymer particles are dissolved in the solvent of the polymer solution, the so-formed mixture is passed to decanting means to separate a major proportion of the water from the polymer solution and the polymer solution is passed to said one or more vessels in series wherein it is contacted with steam and hot water to form said slurry of polymer particles in water and said vapour stream and the remaining portion of the water stream containing small particles of polymer is passed to and mixed with the contents of the first of said one or more vessels where the polymer solution is contacted with steam and hot water.

The polymers which may be recovered from solution in the present invention include polybutadiene, styrene-butadiene polymer, ethylene-propylene rubber, ethylene-propylene-non-conjugated diene rubber, butyl rubber, bromobutyl rubber, chlorobutyl rubber and hydrogenated butadiene-acrylonitrile rubber, the manufacture of which is well known. Such polymers may be in solution in solvents selected from organic hydrocarbons including butane, pentane, hexane, benzene, toluene, cyclopentane, cyclohexane, methylcyclohexane, chlorobenzene, mixtures thereof and mixtures with other organic solvents such as butene, propylene, tetrahydrofuran and the like. Generally the concentration of polymer in the solution may be from about 2 to about 25, preferably from about 5 to about 20 and most preferably from about 10 to about 18, weight percent based on polymer plus solvent. The polymer solution may be at a temperature of from about 20° to about 80° C. The polymer solution is passed to one or, preferably, more, and usually two, vessels in series in which it is contacted with steam and hot water. Such vessels are usually vertical vessels equipped with one or more lines on or at the top for the removal of the vapour stream, one or more lines for introducing water, an agitator, one or more lines at or near the bottom of the vessel for introducing steam, in the first of such vessels a temperature regulator controller usually controlling the amount of steam introduced, a line at the bottom of the vessel for the removal of the polymer slurry and an inlet line for the polymer solution usually located below the midpoint of and preferably at about one quarter up the height of the vessel. Preferably two such vessels are used in series so that a significant proportion of the solvent can be removed in the first such vessel and the remaining solvent can be essentially removed in the second such vessel which usually is equipped only with an agitator, an inlet line for the slurry in water from the first vessel, one or more lines for the removal of the vapour stream and one or more lines for the introduction of steam which may be controlled by a flow meter. The slurry of polymer particles in water from the vessel is then passed to a means to grossly separate the polymer from the water. Such a means may be a mechanical type filter, a double roll press or the like. Such a means yields polymer particles which are water wet and a water stream which contains small particles of polymer.

Typically such small particles of polymer will have a maximum dimension of about 0.5 to 1 mm and many of the particles will have a maximum dimension of as low as 0.1 mm. Means are not readily available to be able to rapidly and effectively separate the small particles from the water and, accordingly, some small particles remain with the water. Generally, the quantity of small particles in the water will be from about 1 to about 7, more usually from about 1 to about 5, kilograms per 1000 kilograms of water plus particles—that is from about 0.1 to about 0.7, more usually from about 0.1 to about 0.5, weight percent based on the water plus particles. Such a level of small particles in water still has to be removed from the water before it can be re-used or discharged and is also a loss of product.

The improvement in the process of this invention is that a portion of the water stream containing small particles of polymer is mixed with the original polymer solution and the remaining portion of the water stream containing small particles of polymer is passed to and mixed with the contents of the first of said one or more vessels where the polymer solution is contacted with steam and hot water. The mixing with the original polymer solution allows the small particles of polymer to be dissolved in the solvent of the polymer solution, thereby removing them from the water stream. Preferably the polymer solution is passed to a suitably sized vessel which preferably provides a residence time from about 5 to about 60 minutes so that the polymer solution and the water stream containing said small particles of polymer may be adequately mixed such that the small particles of polymer are dissolved in the solvent. The mixture is then passed to decanting means wherein the polymer solution and the water are separated so that a major proportion, that is from about 80 to about 99 percent of the water present, is removed. The water that is separated will contain no polymer particles— it may contain a small amount of the solvent which can be readily steam stripped. This water may be treated if necessary to remove any dissolved inorganic compounds and then discharged. The polymer solution from the decanting means is then passed to the first of the one or more vessels in series for contact with steam and hot water. That portion of the water stream containing small particles of polymer which is passed to and mixed with the contents of the first of said one or more vessels where polymer solution is contacted with steam and hot water is mixed with the contents of said vessel which allows the small particles of polymer to be combined with the particles of polymer being formed in said vessel thereby incorporating all the particles together. Generally, the portion of the water stream containing small particles of polymer which is mixed with the original polymer solution is from about 10 to about 25 volume percent of the water stream and the remaining portion which is passed to and mixed with the contents of said first vessel is from about 75 to about 90 volume percent of the water stream. For every 100 parts by weight of the original polymer solution there is added from about 50 to about 200, preferably from about 50 to about 150, parts by weight of water containing small particles of polymer.

EXAMPLE

In a process for the manufacture of bromobutyl rubber, butyl rubber (a copolymer of isobutylene and from about 1 to about 3 weight percent of isoprene) dissolved in hexane is treated first with bromine to form bromobutyl rubber and then with aqueous sodium hydroxide to neutralize the hydrogen bromide formed and to react with any excess bromine. This stream is then water washed and the bromobutyl rubber solution in hexane is ready for recovery of the bromobutyl rubber by contacting the bromobutyl rubber solution with steam and hot water followed by the gross separation from the water of the particles of bromobutyl rubber and drying of the particles. The concentration of the bromobutyl in hexane is from about 12 to about 20 weight percent based on the bromobutyl rubber plus hexane. A water stream from a mechanical separator contains about 0.3 weight percent of small polymer particles. This vessel is equipped with an agitator and for every 100 parts by weight of bromobutyl rubber solution fed to it, 50 to 150 parts by weight of water containing small particles of polymer are also supplied. The average residence time in this vessel is about 0.1 to about 0.5 hours which is adequate to dissolve the small polymer particles in the hexane. The product from this vessel is then fed to a decanter wherein the organic and aqueous phases are roughly separated. The aqueous phase is withdrawn from the decanter and contains essentially no polymer and a very small amount of hexane—this may be treated with steam in order to steam strip the hexane and is then suitable for discharge. The organic phase from the decanter (the polymer solution containing a small amount of water) is fed to the first of two vessels in series for coagulation and stripping. Also fed to said first vessel is about 90% by volume of the aforesaid water stream containing small particles of polymer from the mechanical separator. For every 100 parts by weight of bromobutyl rubber solution fed to such first vessel from about 500 to about 1500 parts by weight of water containing small particles of polymer are also supplied. The first such vessel is a vertical vessel equipped with an agitator, having at its top end a line for removal of vapours, which line is connected to a condenser wherein the vapours are condensed to liquid and the hexane and water separated, having at its bottom end a line for supply of hot water, a line for supply of steam, a temperature regulator controller which regulates the temperature by controlling the quantity of steam supplied, and a line for removal of the slurry of polymer particles in water. The polymer solution is fed into the vessel at a point about one quarter up the height of the vessel. The slurry of polymer particles in water from this first vessel is fed to the second vessel which is also a vertical vessel equipped with an agitator, having at its top end a line for removal of vapours, which line is connected to a condenser wherein the vapours are condensed to liquid and the hexane and water separated, having at its bottom end a line for supply of steam, a flow meter which controls the quantity of steam supplied, and a line for removal of the slurry of polymer particles in water. This slurry of polymer particles in water contains minimal traces of hexane. It is fed to a mechanical shaker-separator which yields water wet polymer particles and a water stream which contains about 0.3 weight percent of small polymer particles. The water wet polymer particles are fed to a drying system comprising a dewatering extruder and an extruder drier to produce bromobutyl rubber containing a maximum of 0.5 weight percent of water. The water stream is fed, as hereinbefore described, to the process. By the process of this Example, no polymer leaves the unit operation in any of the water streams whereas in the prior art process about 0.3 weight percent of the polymer left the unit suspended in one or more of the water streams which required such water streams to be separately treated to remove the small particles of polymer before it could be discharged. Thus the process of this invention reduces polymer losses and, more importantly, reduces the treatment necessary for the water stream before it could be discharged.

What is claimed is:

1. An improved process for the recovery of a polymer from a solution thereof in a solvent wherein polymer solution is supplied to one or more vessels in series wherein it is contacted with steam and hot water to form a slurry of polymer particles in water and a vapour stream comprising water vapour and solvent from the polymer solution which vapour stream is treated to recover the solvent, wherein the slurry of polymer particles in water is passed to means to grossly separate the polymer from the water to yield water wet polymer particles and a water stream which contains small particles of polymer and wherein the water wet polymer particles are passed to polymer drying means to yield essentially dry polymer, the improvement being that a portion of the water stream containing small particles of polymer is mixed with the original polymer solution whereby the small polymer particles are dissolved in the solvent of the polymer solution, the so-formed mixture is passed to decanting means to separate a major proportion of the water from the polymer solution and the polymer solution is passed to said one or more vessels in series wherein it is contacted with steam and hot water to form said slurry of polymer particles in water and said vapour stream and the remaining portion of the water stream containing small particles of polymer is passed to and mixed with the contents of the first of said one or more vessels where the polymer solution is contacted with steam and hot water and wherein the polymer is selected from polybutadiene, styrene-butadiene polymer, ethylene-propylene rubber, ethylene-propylene-non-conjugated diene rubber, butyl rubber, bromobutyl rubber, chlorobutyl rubber and hydrogenated butadiene-acrylonitrile rubber.

2. The process of claim 1 wherein the concentration of small particles of polymer in the water stream is from about 0.1 to about 0.7 weight percent based on water plus particles.

3. The process of claim 1 wherein the solvent is one or more organic hydrocarbons.

4. The process of claim 1 wherein the polymer solution contains from about 5 to about 20 weight percent of polymer based on polymer plus solvent and is at a temperature of from about 20° to about 80° C.

5. The process of claim 1 wherein the volume of the water stream containing small particles of polymer that is mixed with the original polymer solution is from about 50 to about 150 parts by weight per 100 parts by weight of polymer solution.

6. The process of claim 5 wherein the volume of water removed from said decanting means is from about 80 to about 99% of the total water present therein.

7. The process of claim 1 wherein the portion of the water stream containing small particles of polymer which is mixed with the original polymer solution is from about 10 to about 25 volume percent of the water stream and the portion which is passed to and mixed with the contents of said first vessel is from about 75 to about 90 volume percent of the water stream.

8. The process of claim 7 wherein for 100 parts by weight of original polymer solution there is added from about 50 to about 150 parts by weight of water containing small particles of polymer.

* * * * *